United States Patent [19]

Kapralis et al.

[11] Patent Number: 4,899,727
[45] Date of Patent: Feb. 13, 1990

[54] IMPERFORATE GROOVE TRIGGER

[76] Inventors: Guntars I. Kapralis, 15039 Wedgeworth Dr., Hacienda Heights, Calif. 91745; Janis E. Kapralis, 21 Sunset Ave., #3, Venice, Calif. 90291; Jeralynn Lowther, 756 Hamilton La., Fallbrook, Calif. 92028

[21] Appl. No.: 326,014

[22] Filed: Mar. 20, 1989

[51] Int. Cl.$^4$ ............ F24J 1/00; B21D 22/00
[52] U.S. Cl. ................ 126/263; 422/245; 72/362; 604/291
[58] Field of Search ........... 126/263, 204, 205, 206; 604/289–291; 422/245, 246; 128/399–403; 62/259.3; 72/362, 379, 700, 702

[56] References Cited

U.S. PATENT DOCUMENTS

| | | | |
|---|---|---|---|
| 3,332,268 | 7/1967 | Hiegel | 72/379 |
| 3,683,889 | 8/1972 | Hoffman | 126/263 |
| 4,077,390 | 3/1978 | Stanley et al. | 126/263 |
| 4,106,477 | 8/1978 | Feld | 126/263 |
| 4,379,448 | 4/1983 | Kapralis et al. | |
| 4,460,546 | 7/1984 | Kapralis et al. | |
| 4,532,110 | 7/1985 | Kapralis et al. | |
| 4,559,047 | 12/1985 | Kapralis et al. | |
| 4,572,158 | 2/1986 | Fielder | 126/263 |
| 4,580,547 | 4/1986 | Kapralis et al. | |

Primary Examiner—Larry Jones
Attorney, Agent, or Firm—William W. Haefliger

[57] ABSTRACT

An economically fabricated trigger for initiating crystallization of supercooled solutions in flexible plastic containers, the trigger comprising a thin substantially imperforate metallic strip having a perimeter bounding a generally dish-shaped or concave portion, the strip further having a plurality of spaced, generally parallel, generally V-shaped elongated grooves formed inwardly from the perimeter, the strip being imperforate at the groove, with the centermost portion substantially free of grooves, the strip having two configurations between which it is distortable or bendable with snap-displacement causing the initiation of progressive exothermic crystallization of said salt in the solution, the strip metal being typically impacted during fabrication to impact orient the molecular structure so as to aid the functioning of the disc or strip to produce or initiate crystallization.

22 Claims, 3 Drawing Sheets 4,899,727

1

IMPERFORATE GROOVE TRIGGER

BACKGROUND OF THE INVENTION

This invention relates generally to the initiation of crystallization of a supercooled salt solution, and more particularly, to the provision of a highly advantageous trigger that is easily deformable and is constructed to initiate such crystallization when the trigger is deformed, and which minimizes or prevents unwanted or inadvertent crystallization initiation.

Devices of the general type with which the present invention is concerned are described in U.S. Pat. No. 4,077,390 issued Mar. 7, 1978, to Stanley et al. for "Reusable Heat Pack Containing Supercooled Solution and Means for Activating Same"; however, such devices have tended to suffer from unreliable triggering of crystallization. For example, jarring of the actuator strips will at times inadvertently initiate crystallization. This greatly aggravates the user and reduces the practicality and utility of such devices.

Other patents which show and describe such triggers for use in such solutions are U.S. Pat. No. 4,379,448, issued Apr. 12, 1983, to Kapralis et al. for "Trigger to Initiate Crystallization"; U.S. Pat. No. 4,460,546, issued July 17, 1984, to Kapralis et al. for "Trigger to Controllably Initiate Crystallization"; and U.S. Pat. No. 4,532,110, issued July 30, 1985, to Kapralis et al. for "Protected Trigger to Controllably Initiate Crystallization". Patents related to other aspects of the device are U.S. Pat. No. 4,559,047, issued Dec. 17, 1985, to Kapralis et al. entitled "Heat Producing Mask and Use Thereof", and U.S. Pat. No. 4,580,547, issued Apr. 8, 1986, to Kapralis et al. entitled "Flexible Heat Pack Containing Super Cooled Salt Solution".

The patents hereinabove referenced relate to flexible packs containing supercooled salt solutions with trigger mechanisms having spaced slots or slits. The latter tend to pass supercooled fluid therethrough when the flexible pack is moved about, as during shipment; and it is found that unwanted crystallization of the salt solution can at times inadvertently occur, prior to ultimate manual flexing of the trigger by the user. There is need for a trigger construction that prevents or minimizes such inadvertent crystallization.

SUMMARY OF THE INVENTION

It is a major object of the present invention to provide an improved, substantially imperforate trigger which will reliably and repeatedly produce or initiate crystallization of supercooled solutions, which will not pass salt solution through the trigger at slots therein, and which will not injure or tear the plastic container in which it is incorporated. Fundamentally, the trigger comprises:

(a) a thin, substantially imperforate metallic strip having a perimeter bounding a dished portion spaced inwardly of that perimeter, (b) a plurality of spaced generally V-shaped grooves formed at least in part within the dished portion, the central portion being imperforate at the grooves, (c) the strip further characterized as having two configurations between which it is bendable with snap-displacement causing the initiation of progressive exothermic crystallization of said salt in the solution, and further having molecular structure which is impact oriented.

As will appear, the grooves do not extend openly through the strip, that is between its opposite sides, but do have outwardly projecting, widthwise concave portions or apices at which cracks are formed during groove forming die impact. When the strip is flexed, the solution contacting the sharp edges of the strip at such cracks is locally sharply jarred or accelerated, initiating crystallization; however, since solution does not flow through the strip via any narrow slits, inadvertent crystallization is prevented.

It is another object to provide such grooves which are elongated in generally parallel relations, the cracks at convex surfaces extending lengthwise of the grooves. The grooves may be formed to extend in an annular portion of the strip that bounds a groove-free central portion, the latter being subject to manual snap-displacement between two configurations, as will appear.

It is a further object to provide a protector carrying the strip and bounding its perimeter so that the latter will not cut or injure the flexible plastic pack.

As will also appear, the strip is typically substantially imperforate throughout, and the grooves may constitute spaced, generally parallel grooves which are generally V-shaped and widthwise concave relative to the concave surface of the dish-shaped portion of the trigger. The grooves are closely spaced relative to each other to provide rigidity for assisting in restoring the configuration after the snap-action. The snap-action of the trigger imparts sudden transfer of energy to the solution, with the V-shaped grooves widening upon deformation of the trigger from its stable state, and then suddenly narrowing on return, thereby compressing the solution trapped therein as in cracks. The trigger is typically formed as a disc having a central portion concentric to the boundary or periphery of the disc, with the grooves being generally parallel and closely spaced while intersecting or crossing the acute edge of the dished central portion. The latter is adapted to "oil can" or snap "over center" when the disc is subjected to flexing or bending. The disc or strip metal used to form the trigger is typically impacted during fabrication to impact orient the molecular structure so as to aid the functioning of the disc or strip to produce or initiate crystallization. The strip may typically consist of phosphor bronze or beryllium copper, or other workable metal.

Other objects and advantages of the invention, as well as the details of an illustrative embodiment, will be more fully understood from the following description and drawings, in which:

DRAWING DESCRIPTION

Figure 3:
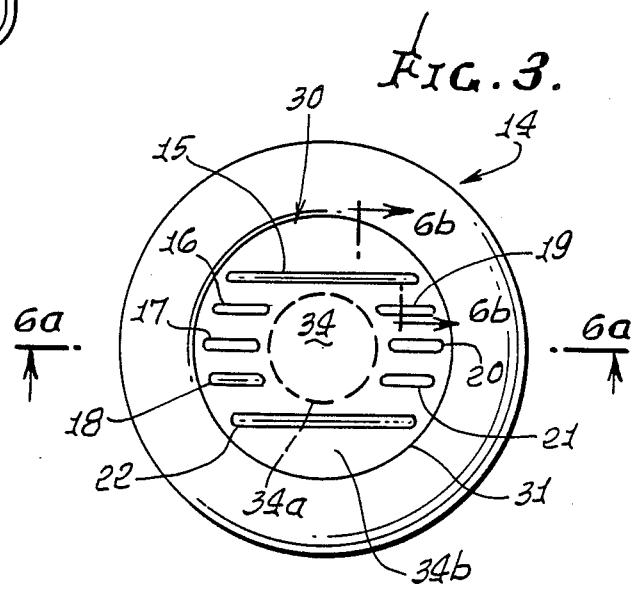
FIG. 3 is a further enlarged top plan view of the trigger seen in FIG. 2.
Figure 6A:
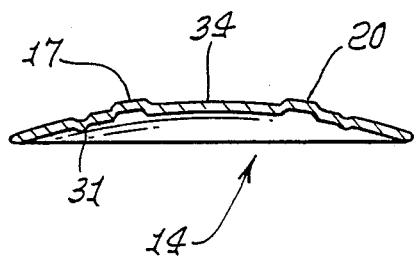
FIG. 6a is a cross-sectional view of the trigger of FIG. 3 as viewed along line 6a—6a thereof.
Figure 6B:
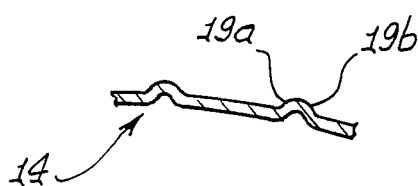
Figure 7:
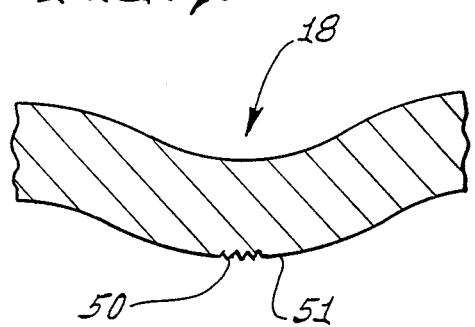
Figure 8:
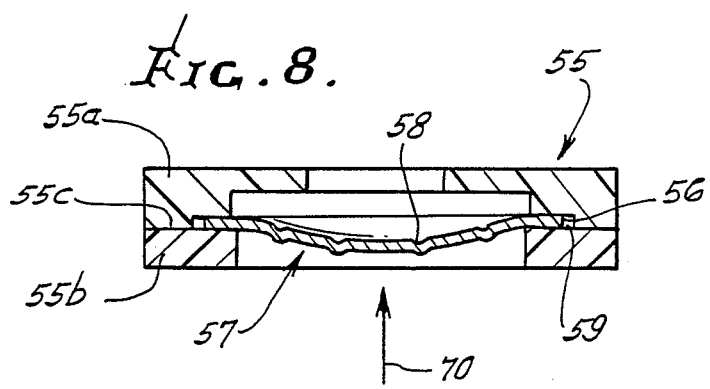

FIG. 6b is a cross-sectional view of the trigger of FIG. 3 as viewed along a line 6b—6b which is displaced 90 degrees from line 6a—6a;

FIG. 7 is a much enlarged cross section across an imperforate groove, to show cracks; and FIG. 8 is a section showing a protector for the strip.

Figure 9:
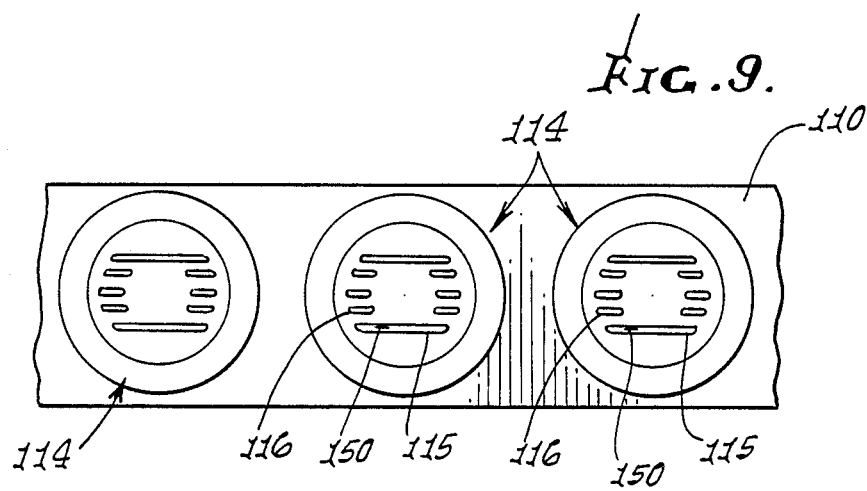

FIG. 9 shows triggers formed on an elongated metallic sheet; and

Figure 10:
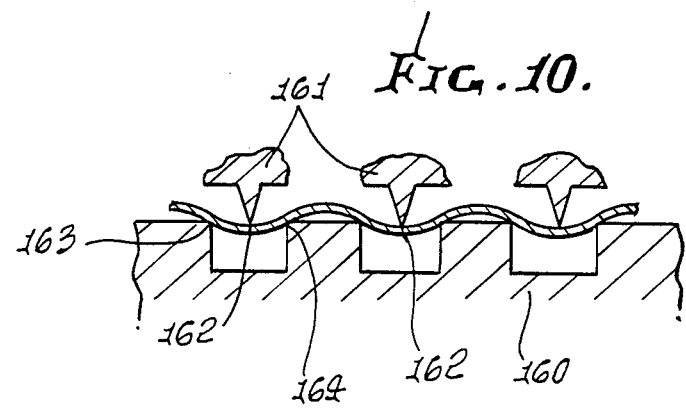
Figure 11:
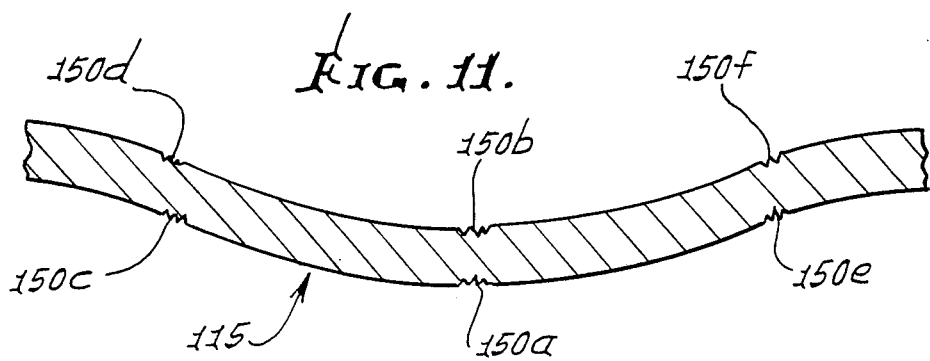

FIGS. 10 and 11 show multiple crack formation.

DETAILED DESCRIPTION

Figure 1:
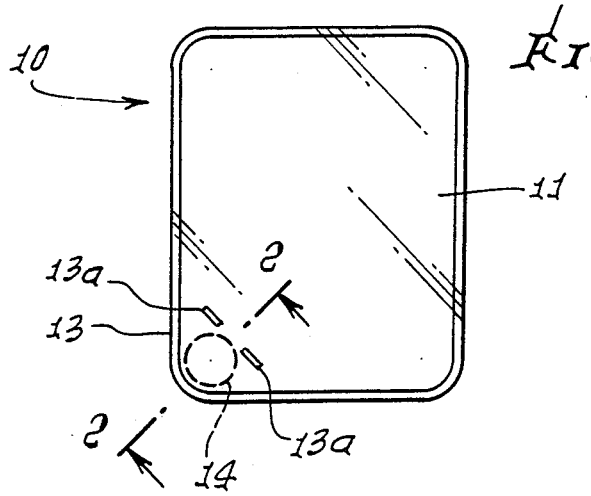
FIG. 1 is a plan view of a device incorporating the invention.
Figure 2:
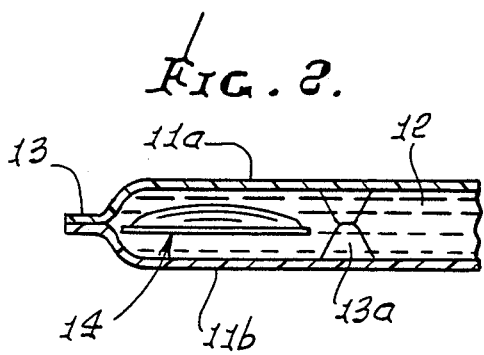
FIG. 2 is an enlarged section taken on lines 2—2 of FIG. 1, and showing a trigger in one side elevation configuration.

Referring first to FIGS. 1 and 2, a flexible heat pack 10 includes a flexible plastic container 11 containing a supercooled solution 12, one example being aqueous sodium acetate as referred to in U.S. Pat. No. 4,077,390. The container may consist of translucent or transparent plastic, such as polyethylene or PVC. The upper and lower container walls 11a and 11b may be peripherally bonded or heat sealed together, as indicated at 13, whereby the solution 12 is contained against leakage.

Located in the container 11 is a trigger 14 adapted to be deformed to initiate exothermic crystallization of the salt in the solution, and for that purpose the concentration of the salt is sufficient to produce such crystallization in response to trigger bending, as well be described. The trigger may be retained in the corner of the rectangular container 11 by interruptedly bonded portions of the container walls, indicated at 13a, inwardly of peripheral bonding 13. At the same time, the solution has access to the trigger 14, at all times, via interruptions between bonded portions 13a. Other trigger locations are usable, or, the trigger 14 may freely float in different locations of the container.

Generally speaking, the trigger 14 comprises a thin strip, (for example about 0.005 inches thick) such as a metallic disc, having a perimeter indicated at 14a in FIG. 3. Workable non-ferrous metals have been found to include phosphor bronze and beryllium copper. Phosphor bronze typically consists of about 80% copper, 10% tin, 9% antimony, and 1% phosphorus. Beryllium copper is a copper alloy containing a small amount of beryllium and typically some nickel or cobalt. Perimeter 14a is free of sharp edges that could injure or penetrate the plastic walls 11a and 11b.

Figure 4:
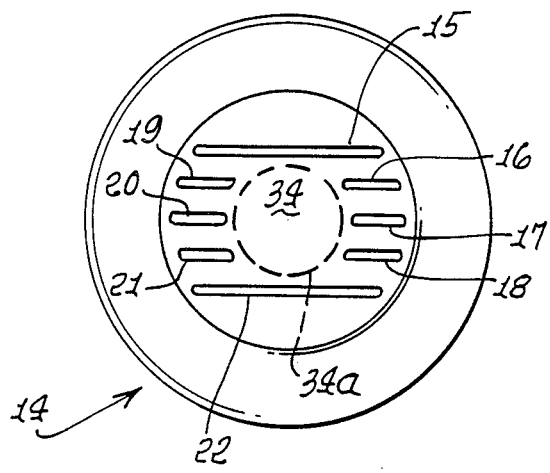
FIG. 4 is an enlarged bottom plan view of the trigger seen in FIG. 2.

By reference to FIGS. 3 and 4, the trigger 14 has a generally circular perimeter in plan elevation, that is, it is generally disc-shaped, with a concentric concave dished, or dish-shaped portion 30 formed therein with a circular peripheral acute edge 31. The strip has a plurality of generally parallel, like, shallow, V-shaped grooves 15–22, formed therein, each groove having opposite long sides, for example sides 19a and 19b (see FIG. 6b) which face one another in proximate divergent relation. Typically, the grooves are narrow in width relative to the length thereof, and preferably extend or near the circular peripheral edge 31 of the dished portion 30. Various numbers of grooves may be used.

FIGS. 6a and 6b show details of the grooves 15–22, and it is to be noted, as shown in FIGS. 3 and 4, that the grooves 15 and 22 adjacent opposite sides of the dished central portion 34 extend completely across, while the intermediate grooves 16–21 are shortened. Grooves 16 and 19 are in alignment with one another, as are the grooves 17 and 20, as well as grooves 18 and 21. These pairs of aligned grooves are interrupted at the outermost part 34a (defined by the dotted lines shown in FIG. 4) of the dish-shaped central portion 34 so as not to interfere with the over-center or snap-action of the trigger 14. The space between the circumference of the dotted line 34a and the circumference of the edge 31 defines an annular portion 34b of the dished disc, in which the grooves 15–22 extend.

Figure 2A:
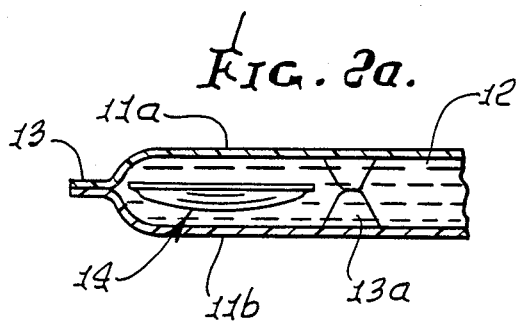
FIG. 2a is a side elevation showing the FIG. 2 trigger in a second side elevation configuration, i.e., after snap-displacement.

The disc-shaped strip 14 is characterized as having two configurations between which it is bendable with snap-displacement from the stable configuration shown in FIGS. 3 and 4, to the inverted dished configuration 14' shown in FIG. 2a. During this initial movement, the grooves 15–22 widen, or diverge. Upon return to the stable configuration, the sudden narrowing of the distance between the long sides (e.g., 19a, 19b) of the grooves 15–22 causes compression of the solution trapped therebetween to thereby initiate progressive exothermic crystallization of the salt in the supercooled solution in the container.

Note, for example, the first stable configuration of the trigger strip 14 in FIG. 2, and its second (and relatively stable) curved configuration 14' in FIG. 2a. The user simply applies finger pressure on the container walls 11a and 11b, and snap-deforms the disc 14 to the FIG. 2a configuration, in the container 11, and releases the same, thereby causing the actuation of the crystallization, due to sudden deformation (as for example sudden local compression) of the solution trapped or confined in the spaces between the adjacent or proximate long sides of the grooves 15–24, the snap-displacement of the trigger 14 being found to initiate crystallization without failure or malfunction. FIG. 7 shows minute cracks 50 formed in the projecting widthwise convex or bulged surface extent 51 of a groove 18 upon impact formation of the grooves, the cracks running lengthwise of the groove. Solution in such cracks is sharply jarred or accelerated upon snap-displacement of the strip, causing initiation of crystallization.

Figure 5:
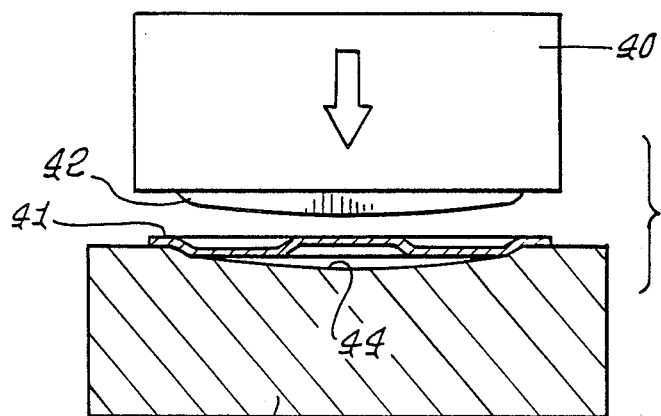
FIG. 5 is a side elevation of tooling showing a step in the fabrication of the FIGS. 2 and 3 trigger.

These purposes are served to unusual advantage by causing the disc or trigger 14 to have the dished configuration as in FIG. 2, so as to "oil-can" when deformed, i.e., easily snap over-center into FIG. 2a configuration 14'. Further, the disc is imperforate, with no minute through slits or through openings required for its action thereby facilitating the manufacture thereof and also preventing solution accelerated flow through the strip at narrow through slits, such accelerated flow at times leading to unwanted crystallization. For fabrication of the trigger 10, a strip of metal is first punched to form the grooves 15–22 as shown in FIG. 5, and at the next station, the dished portion 34 is formed, and thereafter the strip is cut with a circular die to form the discs.

Finally, the performance of the disc-shaped strip to initiate crystallization is aided by impact orientation of the molecular structure of the disc 14. FIG. 5 shows a striker 40 being forcibly urged downwardly toward blank 41, after the latter has had the grooves 15–22 formed therein as described. The bottom of the striker is protuberant at 42 to "dish" the blank (i.e., permanently deform it to have a central bulge as in FIG. 2); thereafter, the trigger disc is stamped or cut out of the blank by a suitable die. Back up platen 43 in FIG. 5 has a recess 44 to receive the deformed bulge of the blank 41.

In accordance with the present invention, there has been shown a new and improved imperforate trigger 14 which is economically produced. While there has been shown and described a preferred embodiment, it is to be understood that other modifications and adaptations may be made within the spirit and scope of the invention without departing from the spirit and scope thereof.

FIG. 8 shows a protector 55 bounding an protecting the periphery 56 of the disc-shaped trigger strip 57 having imperforate grooves 58 as referred to in FIG. 3 for example. Arrow 70 indicates manual force application to centrally flex the strip. Edge 56 is received in a slot 59 formed by the protector. The latter may be made in two pieces 55a and 55b, joined at 55c.

FIG. 9 shows a metallic strip 110 from which triggers 114 (like that at 14) are blanked, as by a cutting die. The grooves, as at 115 and 116 and others, correspond to V-shaped grooves 15 and 16 and others referred to above. All the grooves extend in the direction of strip 110 elongation, whereby their formations and formation of elongated minute cracks 150 does not weaken the strip, widthwise. Cracks 150 correspond to those seen at 50 in FIG. 7.

FIGS. 10 and 11 show the formation of multiple elongated cracks 150a, b, c, d, e, and f running lengthwise of, and at, each groove, as follows:

crack 150a is at the convex crest (as in FIG. 7)
crack 150b at the concave crest
cracks 150c and d are at and in opposite sides of the groove, in one angled wall
115a formed by the groove
cracks 150c and f are at and in opposite sides of the groove, in the opposite angled wall 115b formed by the groove Such cracks may be formed by using lower and upper forming die members as seen at 160 and 161 in FIG. 10. Sharp edges 162 are carried by the upper die to penetrate the trigger metal at the center of the V-shaped groove, to form crack 150b, the opposite crack 50a opening up or forming upon deformation of the metal. Sharp edges 163 and 164 are carried by the lower die to penetrate the trigger metal at opposite side walls 115a and 115b, to form cracks 150c and 150e, the opposite cracks 150d and 150f opening up or forming upon deformation of the metal. The cracks preferably do not extend to the ends of the grooves, as that would undesirably weaken the main metallic extent of the trigger between or extending away from the grooves.

We claim:

1. For use in initiating crystallization of a supercooled salt solution, the combination that includes a flexible container containing said solution, and an improved trigger located in the container in contact with the solution, the trigger comprising:
   (a) a thin, substantially imperforate metallic strip having a perimeter bounding a dished portion,
   (b) a plurality of spaced generally V-shaped grooves formed at least in part within said dished portion, said dished portion being imperforate at said grooves,
   (c) the strip further characterized as having two configurations between which it is bendable with snap-displacement causing the initiation of progressive exothermic crystallization of said salt in the solution, and further having molecular structure which is impact oriented.

2. The combination of claim 1 wherein the grooves have outwardly projecting apices at which cracks are formed.

3. The combination of claim 1 wherein all of said grooves terminate endwise inwardly from the strip perimeter.

4. The combination of claim 1 wherein said strip is generally disc shaped.

5. The combination of claim 1 wherein said grooves are elongated in generally parallel relation, each groove being widthwise generally concave relative to the dished portion.

6. The combination of claim 1 wherein said dished portion has a centermost portion and an annular portion, and said centermost portion is substantially free of said grooves.

7. The combination of claim 6 wherein said grooves are spaced generally parallel grooves and are located at least in part in the annular portion of said dished portion.

8. The combination of claim 1 wherein said strip consists of beryllium copper.

9. The combination of claim 1 wherein said strip consists of phospor bronze.

10. The combination of claim 1 including a protector carrying the strip and bounding said perimeter thereof.

11. For use in initiating crystallization of a supercooled salt solution in a flexible container containing said solution, an improved trigger to be located in the container in contact with the solution, the trigger comprising:
   (a) a thin, substantially imperforate metallic strip having a perimeter bounding a dished portion,
   (b) said strip having at least two elongated grooves formed therein and extending inwardly of the strip perimeter, the grooves having elongated, outwardly projecting apices defining cracks in the metal thereof,
   (c) the strip further characterized as having two configurations between which it is bendable with snap-displacement causing progressive exothermic crystallization of said salt in the solution, and
   (d) the strip having molecular structure which is impact oriented.

12. The combination of claim 11 wherein at least some of said grooves have ends that intersect said perimeter and opposite ends that terminate inwardly from said perimeter.

13. The combination of claim 11 wherein said grooves are generally parallel, and widthwise generally concave relative to the dished central portion.

14. The combination of claim 11 wherein said dished portion has a centermost portion and an outer annular portion, and said centermost portion is free of said grooves.

15. For use in initiating crystallization of a supercooled salt solution in a flexible container containing said solution, an improved trigger to be located in the container in contact with the solution, the trigger comprising:
   (a) a thin, substantially imperforate metallic strip having a perimeter bounding an intermediate portion,
   (b) said strip having at least two elongated grooves formed in said intermediate portion, the grooves having elongated, outwardly projecting, widthwise concave portions defining cracks in the metal thereof at convex sides of said concave portions,
   (c) the strip further characterized as having two configurations between which it is bendable with snap-displacement causing progressive exothermic crystallization of said salt in the solution, and
   (d) the strip having molecular structure which is impact oriented.

16. The trigger of claim 15 having additional cracks in the metal thereof at both th concave and convex sides of the concave portions, said cracks extending lengthwise of the grooves.

17. The method of forming an improved trigger for use in initiating crystallization of a supercooled salt solution in a flexible container containing said solution, the improved trigger to be located in the container in contact with the solution, the method comprising:
   (a) forming a thin, substantially imperforate metallic strip having a perimeter bounding an intermediate portion, and also forming at least two elongated grooves formed in said intermediate portion, with the grooves formed to have elongated, outwardly projecting, widthwise concave portions, and forming cracks in the metal thereof and extending therealong,
   (b) the strip further characterized as having two configurations between which it is bendable with snap-displacement causing progressive exothermic crystallization of said salt in the solution.

18. The method of claim 17 wherein said crack forming step is carried out to form multiple cracks in the concave portion of the metal that forms each groove, so that the cracks extend lengthwise of the grooves.

19. The method of claim 17 including confining the cracks in the metal that form th grooves, and away from opposite ends of the grooves.

20. The method of claim 18 wherein the multiple cracks are formed at spaced locations a opposite sides of the trigger and in crest and wall extents of the metal of each groove.

21. The method of claim 17 wherein multiple of said metallic strips are formed as blanks, employing an elongated sheet of the trigger metal, the grooves formed t extend parallel to the direction of elongation of said sheet.

22. The method of claim 21 wherein upper and lower die members are employed, with elongated sharp edges on said members carried to engage opposite sides of the strips to form said cracks.

* * * * *